Feb. 26, 1924. Re. 15,775

H. R. BLISS

METHOD OF CONSTRUCTING FIBER SHIPPING CASES

Original Filed Sept. 24, 1921 6 Sheets-Sheet 1

INVENTOR.

BY Herbert R. Bliss

Stuart C. Barnes

ATTORNEY.

Feb. 26, 1924. Re. 15,775

H. R. BLISS

METHOD OF CONSTRUCTING FIBER SHIPPING CASES

Original Filed Sept. 24, 1921 6 Sheets-Sheet 2

INVENTOR.
Herbert R. Bliss
BY
Stuart C. Barnes
ATTORNEY.

Feb. 26, 1924. Re. 15,775

H. R. BLISS

METHOD OF CONSTRUCTING FIBER SHIPPING CASES

Original Filed Sept. 24. 1921 6 Sheets-Sheet 3

INVENTOR.
Herbert R. Bliss
BY
Stuart C. Barnes
ATTORNEY.

Feb. 26, 1924. Re. 15,775
H. R. BLISS
METHOD OF CONSTRUCTING FIBER SHIPPING CASES
Original Filed Sept. 24. 1921 6 Sheets-Sheet 4
Fig. 4
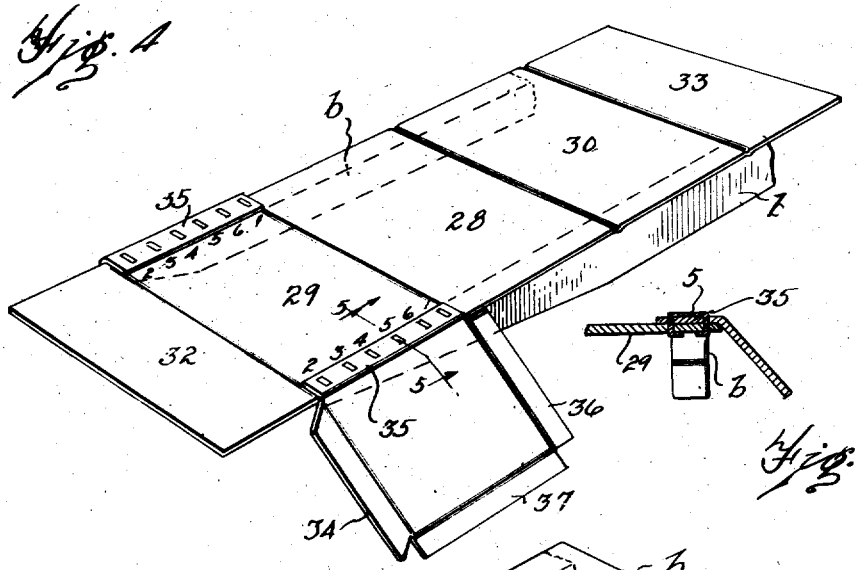
Fig. 5
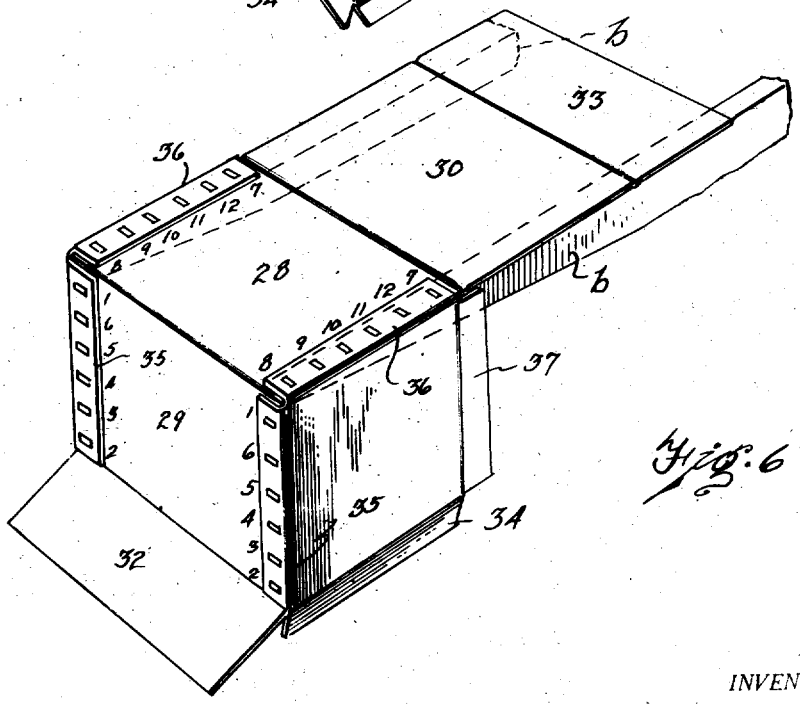
Fig. 6
INVENTOR.
Herbert R. Bliss
BY
Stuart C. Barnes
ATTORNEY.

Feb. 26, 1924. Re. 15,775

H. R. BLISS

METHOD OF CONSTRUCTING FIBER SHIPPING CASES

Original Filed Sept. 24, 1921 6 Sheets-Sheet 5

INVENTOR.

BY Herbert R. Bliss

Stuart C. Barnes

ATTORNEY.

Feb. 26, 1924. Re. 15,775

H. R. BLISS

METHOD OF CONSTRUCTING FIBER SHIPPING CASES

Original Filed Sept. 24. 1921 6 Sheets-Sheet 6

INVENTOR.
Herbert R. Bliss
BY
Stuart C. Barnes
ATTORNEY.

Reissued Feb. 26, 1924. Re. 15,775

UNITED STATES PATENT OFFICE.

HERBERT R. BLISS, OF NIAGARA FALLS, NEW YORK.

METHOD OF CONSTRUCTING FIBER SHIPPING CASES.

Original No. 1,430,151, dated September 26, 1922, Serial No. 502,967, filed September 24, 1921. Application for reissue filed January 2, 1924. Serial No. 684,099.

*To all whom it may concern:*

Be it known that HERBERT R. BLISS, a citizen of the United States, residing at Niagara Falls, in the county of Niagara and State of New York, has invented certain new and useful Improvements in Methods of Constructing Fiber Shipping Cases, of which the following is a specification.

This invention relates to a method of constructing a shipping case and particularly a fiber shipping case. The most common fiber shipping case used is the so-called slotted shipping case, which is one made of a single blank with relatively large flaps on the end and side walls of the blank. These large flaps form four wings at the top and bottom of the case but they are ordinarily wide enough so that the outer pair of flaps when folded down overlap although in some cases they only meet. This construction of a fiber shipping case requires considerable material as the inner flaps are usually comparatively wide, in fact, they are just as wide as the outer pair of flaps. The inner flaps come near to meeting. Their approximation of meeting each other depends altogether upon the length of the case as compared with the width. The longer the case compared with the width the less near meeting the end wall flaps come.

It is the object of the present invention to afford a method of constructing a fiber shipping case which permits the use of blanks which materially lessen the fiber board area required to make the box and thereby results in a large saving in material where the shipper's requirements runs into thousands of boxes a day.

The essence of the method is the simultaneous stitching of the end walls on both ends, thereby very materially lessening the labor cost of constructing the shipping case. This makes possible the realization in the ultimate cost of the box of the full saving resulting from the less material used. Were it necessary to separately stitch on the ends of the box the saving in material would probably be substantially offset by the increased cost in labor in stitching the ends upon the box.

Not only does the broad process comprise the simultaneous setting of stitches at opposite ends of the box but also the method of feeding the box blanks to the stitching heads. This makes the operation a relatively easy one and an effective one, as will presently be shown.

It has been thought advisable to illustrate this method in connection with the machine upon which it is performed, although it will be understood that the method itself is independent of the function of the machine and that the machine is claimed in a copending application.

In the drawings:

Fig. 4 is a perspective of blanks in connection with which the method may be used, showing the first double stitching operation.

Fig. 5 is a sectional detail taken on the line 5—5 of Fig. 4.

Fig. 6 is a perspective of the second stitching operation.

Figure 1:
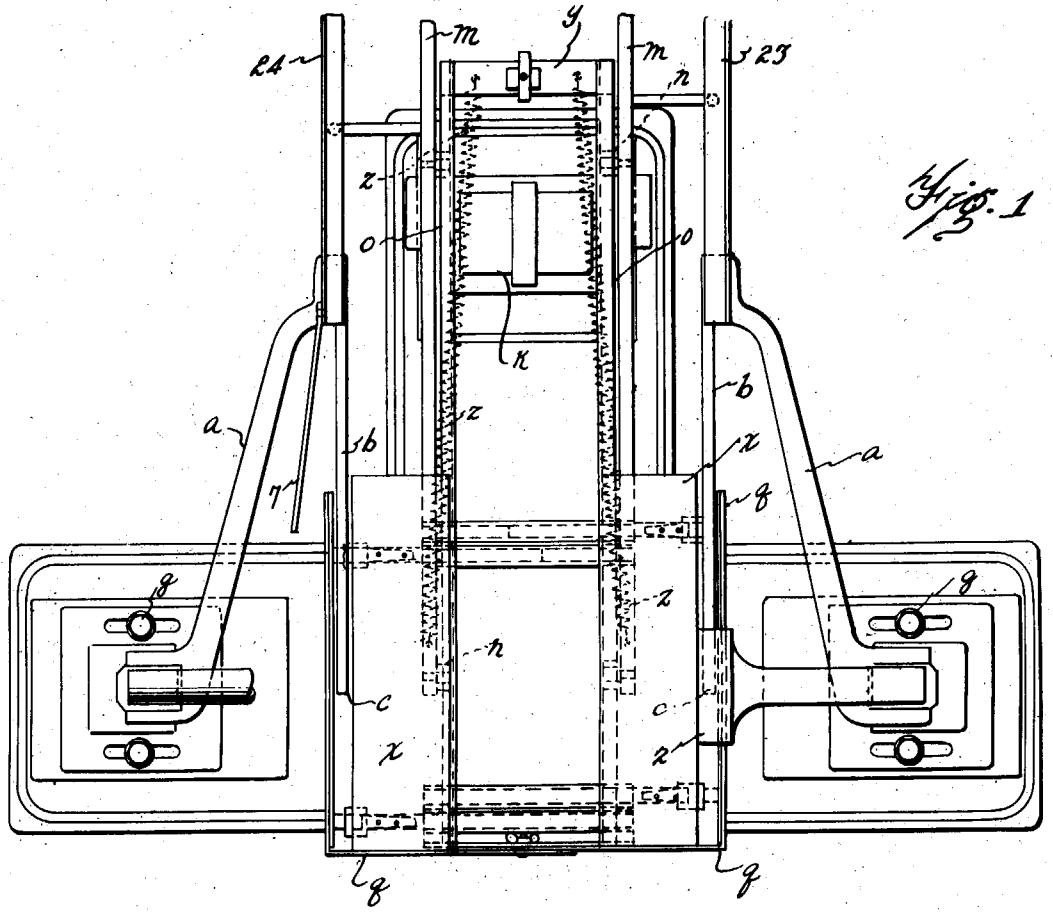
Fig. 1 is a plan view of a machine which may perform the method.
Figure 2:
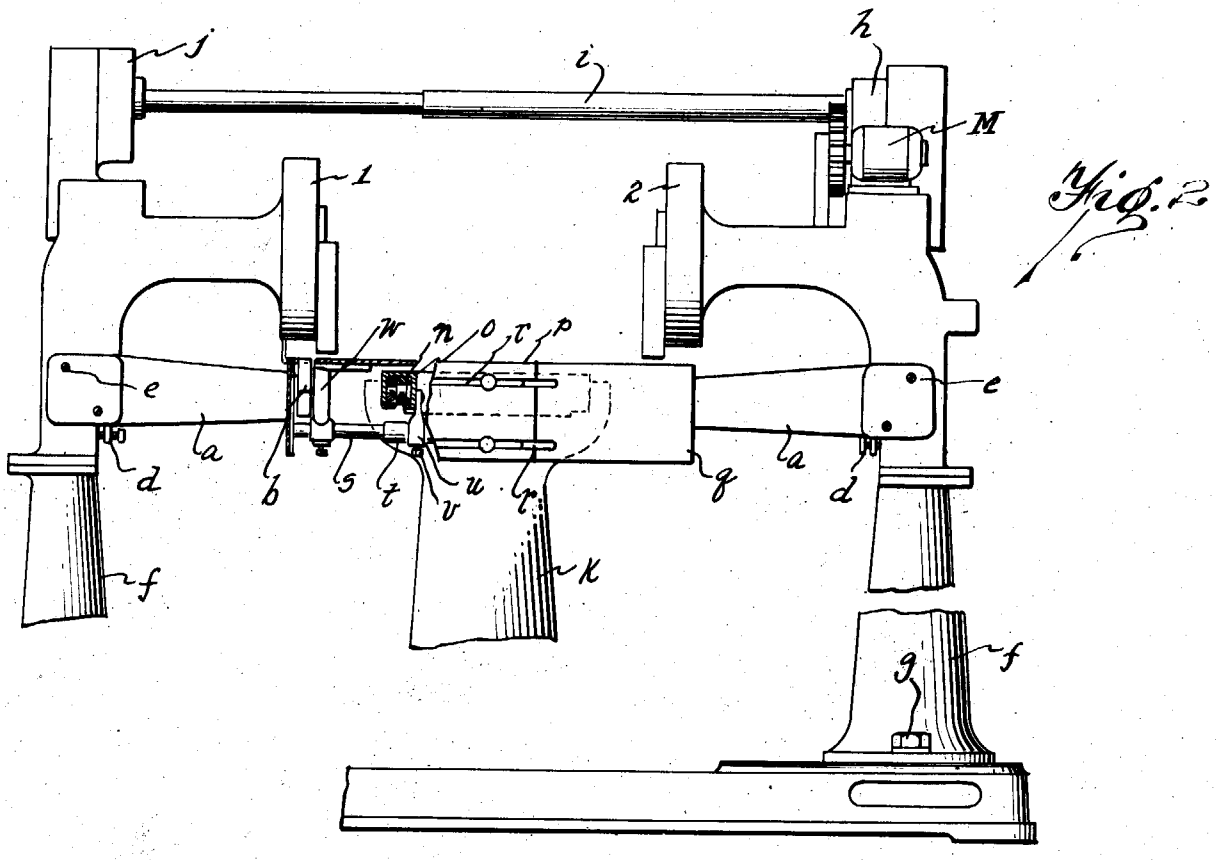
Fig. 2 is a front elevation of the machine, fragmentary in character.
Figure 3:
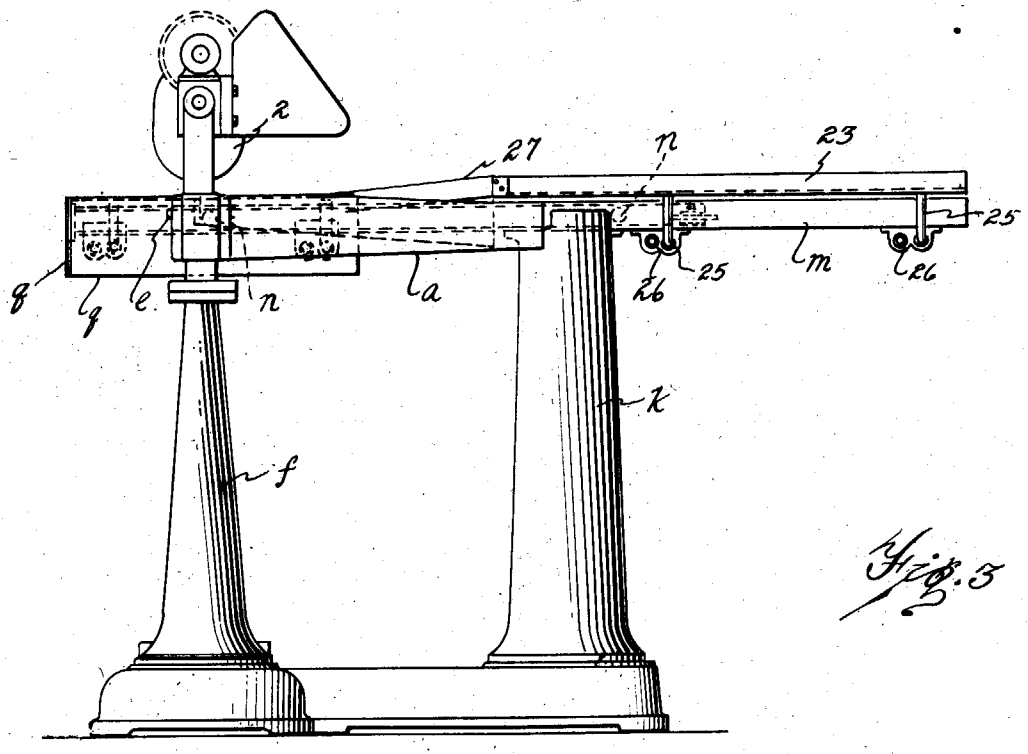
Fig. 3 is a side elevation of the machine.
Figure 7:
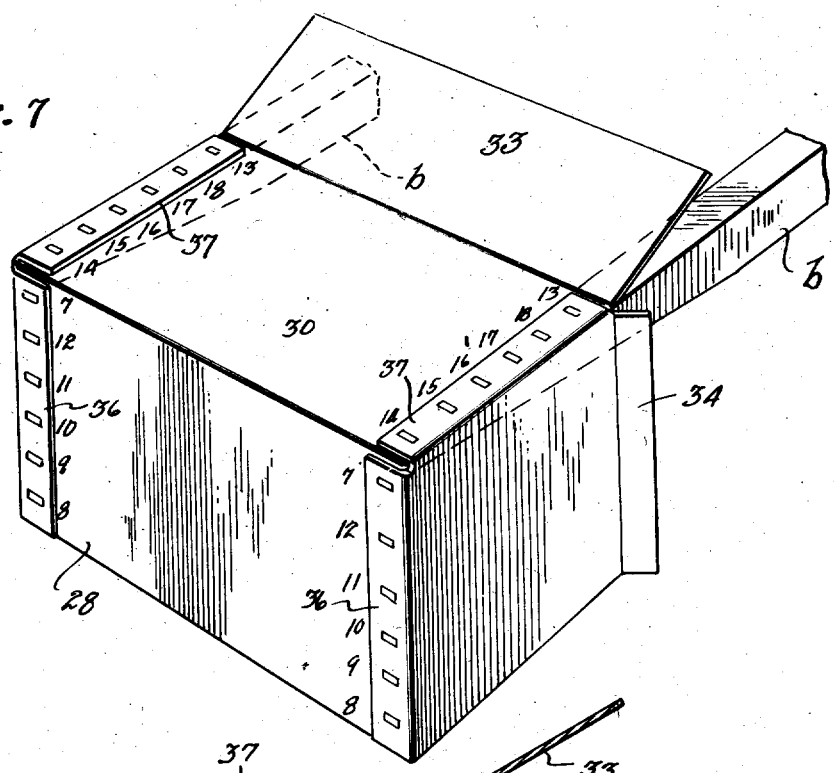
Fig. 7 is a perspective of the third stitching operation.
Figure 8:
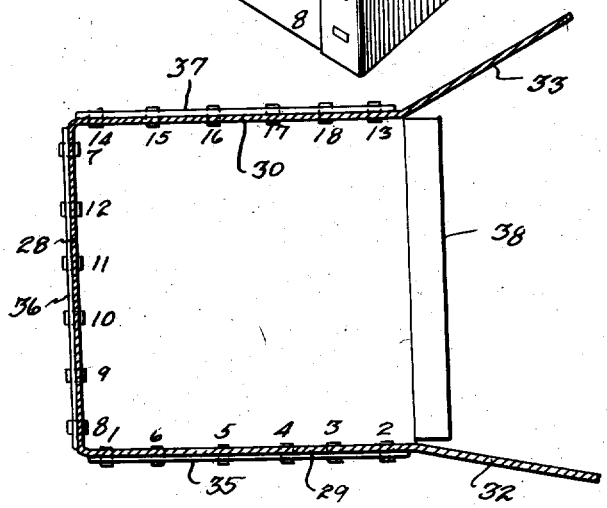
Fig. 8 is a cross section of a finished box with the stitches numbered. This enumeration of the stitches is the preferred order in which they are taken.

Referring to Fig. 2, the numerals 1 and 2 designate wire stitching heads. These wire stitching machines are now commonly used in connection with constructing fiber shipping cases and it will be unnecessary to show the details of the stitching head or explain these. Suffice it to say that they are adapted to use a continuous length of flat copper wire, cut this into suitable short lengths and drive the same down through several layers of fiber board and clinch the same on a suitable anvil to form a wire stitch or staple. Projecting rearwardly from the stitching head is an arm *a* to which is attached a long narrow anvil *b* that reaches forward and is provided with a clinching portion *c* immediately below the stitching head. This anvil may be adjusted slightly by the set screw *d* that causes the anvil to swing on the pivotal point *e*.

These stitching heads face each other and are spaced apart from each other nearly the length of the box. When the length of the box varies the pedestals *f* may be moved toward and from each other by loosening the bolts *g*. These stitching heads are simultaneously operated by power derived from the electric motor M which operates through the transmission *h* and the telescoping transmission shaft *i*, the gears (not shown) in the transmission case *j*, connected with the opposite stitching head 1.

At the rear of the machine is a large pedestal *k* which supports a pair of channel bars *m*. These support blocks on which are journaled the rollers *n*. These rollers *n* fit into the channelled bars *o* that form the frame of a sliding table *p*. This sliding table *p* is provided at the front with a pair of angle plates *q* that are overlapped and slotted at the front as at *r* to permit their being adjusted in toward each other or away from each other to accommodate them to boxes of varying lengths. These angle plates *q* constitute sort of an adjustable form to fit into the inside of the blank as it is in the process of being made up. These form plates are connected together at their sides by the telescoping rods and sleeves *s* and *t* respectively that are hung from the channel frame bars *o* by means of the hangers *u*. The sleeves *t* can be adjusted along the hangers by releasing the set screws *v*. Supported on the rods and sleeves by stems *w* are a pair of plates *x* intended simply as a supporting surface for supporting the body blank of the shipping case that lies on top of it in a manner shortly to be described.

The channel bars *o* of the table frame are connected together at the rear by the cross strip *y*. The long pull springs *z* are attached at one end to this cross bar and run forward and are connected with the stationary bars *m* that form the support for the rollers *n*. The channel bars *o*, the form or angle plates *q*, and the supporting plates *x* constitute a sliding table which can be slid forward and backward on the channel bars *o* and the supporting rollers *n* against the tension of the spring *z*.

Now there is also supported above this table a pair of angle or guide bars 23 and 24. These are supported upon the rod-like elbows 25 which are adjustable through the brackets 26 secured to the under side of the channel bars *m*. These angle bars extend forward about as far as the rear of the arms *a*. Secured to their forward ends are a pair of diverging guide strips 27. These guide bars 23 and 24 in conjunction with the channel bars *m* form a skeleton-like stationary table on which the blanks for the machine operator may be arranged by his assistant.

Figure 9:
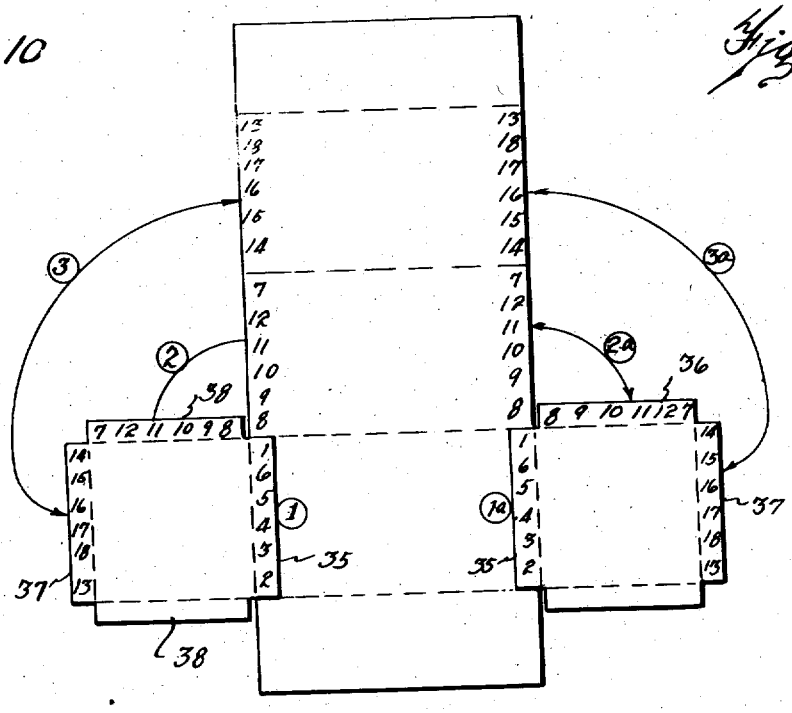
Fig. 9 is a plan view of the blank showing the order in which the stitches are taken in the preferred specific method.

Now referring in particular to Fig. 4, just the character of a body blank with which the method may be used will be seen. It comprises simply a rectangular strip provided with scored lines which form the bottom 28, the side walls 29 and 30 and the sealing flaps 32 and 33. The two end blanks comprise each a square or rectangular piece of board with scored lines to form four shallow flaps 34, 35, 36 and 37. Fig. 9 shows these end blanks very nicely. One end blank is provided with a double flap 34 for aiding in the sealing operation, which is no part of the present invention, which is confined solely to the construction of the box.

The operator's assistant gathers the body blank and two end blanks onto the stationary skeleton frame-work at the rear of the machine. The body blank lies on the skeleton work between the two side guide bars and the two end blanks lay loosely on top of it. He shoves these forward to the machine operator and over the sliding table, which is now at the forward end of its movement. The operator fits the main body blank on to the table, he grasps one of the end blanks in each hand and holds them with the flaps 35 turned over and fitted onto the side wall of the body blank, as shown in Fig. 4. This he can do nicely with the aid of the table which has the form plates *q* and the supporting plates *x*. Note that the anvil *b* lies between these two sets of plates.

Now in the specific method, which I prefer to follow, the operator takes first the stitch 1 (see Fig. 4). This serves to fasten the end blanks to the body blank. Then the table is pushed to the rear, carrying with it the blanks until nearly the opposite end of the shallow flap 35 is reached. Thereupon the machine clutch (not shown) is operated to cause the stitch 2 to be taken. Now all that is necessary to take the remaining stitches 3, 4, 5 and 6 is to let the table itself return, being pulled back by the springs *z*. Every time the machine operates to drive a stitch this stops the table for the table cannot move while the stitches are being driven in. This specific method has the advantage that the first stitch is driven into fasten and locate the parts together; thereupon the whole table is given one long throw forward and allowed to return solely by the spring power. This is a very much easier operation for the operator than to attempt to push it rearward between each set of stitches.

Right here it will not be out of the way to explain why it is necessary that the two stitching heads act synchronously. It is the grabbing of the blank by the stitching heads when the driver comes down to drive the staple that stops the movement of the blank. Now if one head took effect before the other, obviously the blank would continue to travel on one side and would become cocked or awry and the operation a hopeless one. When the stitching heads are synchronously driven by a positive transmission the blank is accurately stopped at precisely the same moment on each side and consequently is not thrown awry.

The second step in the method is to fold up the shallow flaps 36, as shown in Fig. 6, and take the first stitches 7 and then push the table and the blanks backwards, taking the stitches 8, 9, 10, 11 and 12 as the spring is allowed to return the table and blanks toward the operator. The same operation is repeated when the shallow flaps 37 are folded up on the side 30 and the stitches 13, 14, 15, 16, 17 and 18 are taken in precisely the same manner.

Figure 10:
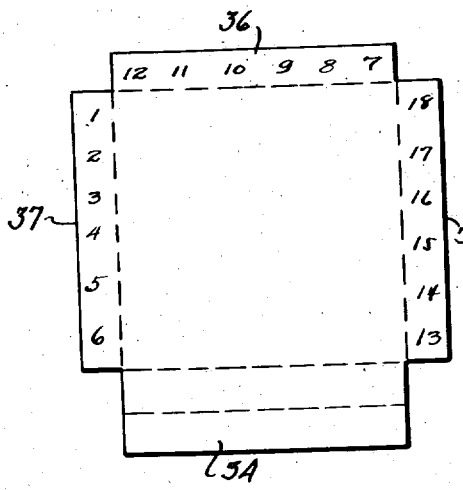
Figs. 10 and 11 are plan views of the end blank showing alternative orders in which the stitches can be taken.
Figure 11:
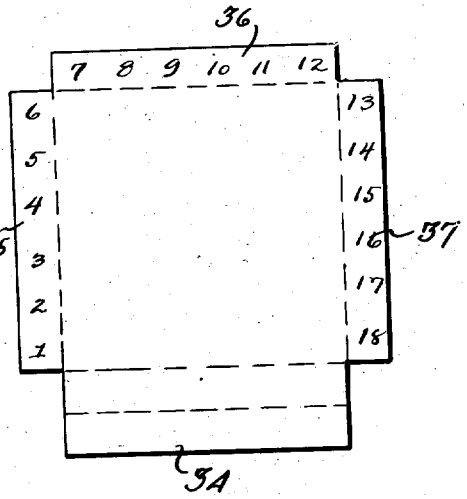

Figs. 10 and 11 illustrate alternative forms. In the order of the stitching shown in Fig. 10 the stitch 1 is taken the same as in the preferred order already described. However, the following stitches are taken by simply pushing the blank in against the tension of the spring. This, however, is more difficult and not as satisfactory a method as that described as the preferred form. In the order of stitching shown in Fig. 11, the blank is first pushed in together with the table and the stitch 1 taken and the following stitches taken in their regular order. This method has the disadvantage that it is awkward. In the preferred order of stitching by placing the first stitch at the rear end of the blank it is much easier to handle the blanks. I have described these several methods as being modified specific processes which belong to the general process which is intended to be claimed in this application.

In the claims the terms "fiber shipping case," "wire stitching," etc., are used. It will be understood that these are words of description and not limitation, as there are obvious equivalents, such as corrugated board for "fiber" and rivets for "wire stitches." It will also be understood that the flaps can be turned under instead of over and still come within my claims, which specify the overlapping of the flaps in order to make the matter definite but with no intention of eliminating equivalent methods.

The term "simultaneously" is used in the claims in the sense of substantially simultaneously.

What I claim is:

1. The method of constructing a fiber shipping case out of a scored body blank and end blanks with flaps, which consists in holding the end blanks so that each end blank has one flap overlapping the opposite ends of the same wall of the body blank, simultaneously stitching such flaps to the wall of the body blank, second, folding the body blank and end blanks to bring another pair of flaps of the end blanks in overlapped relation at the opposite end of the succeeding wall of the scored body blank and simultaneously stitching said two flaps to such wall, and third, folding the body blank and the end blanks to bring a third pair of flaps of the end walls in overlapped relation to the third succeeding wall of the body blank and simultaneously stitching the said pair of flaps to such third wall of the body blank.

2. The method of constructing a shipping case, which comprises the cutting and scoring of a blank to form at opposite ends the cover flaps and three intervening walls constituting the two side walls and the bottom, cutting and scoring two separate blanks to form end walls, each provided with flaps on the various sides of the end wall blank, the securing of the end blanks to the body blank by stitching one flap of each end blank to the opposite ends of the same wall of the body blank and then folding the body blank and the end blanks and stitching the succeeding set of flaps of the end blanks to the opposite ends of the succeeding wall of the body blank and then folding the body blank and the end blanks and stitching the succeeding set of end blank flaps to the opposite ends of the succeeding wall of the body blank.

3. The method of constructing a shipping case, comprising the cutting of a body blank and the scoring of the same to form at opposite ends the cover flaps and three intervening walls, the cutting and scoring of two separate end blanks to form the end walls and a plurality of flaps on the various sides of the ends, and the stitching of the end blanks to the body blank by setting one set of end flaps at opposite ends of the same wall of the body blank and simultaneously stitching them thereto, the folding of the succeeding set of end flaps and the body blank to bring such succeeding set of end flaps into overlapped relation at opposite ends of the succeeding wall of the body blank, and the simultaneous stitching of said flaps to the body blank, and third, the folding of the body blank and the end blanks to bring the succeeding set of end flaps in overlapped relation at opposite ends of the succeeding wall of the body blank to simultaneously stitch them thereto to complete the case.

4. The method of constructing a shipping case which comprises the cutting and scoring of a blank to form at opposite ends cover flaps with intervening side walls and a bottom wall, the cutting and scoring of separate end blanks to form the end wall and relatively shallow flaps on four sides of the end, and the uniting of the end blanks and the body blank and matching the corresponding flaps of the two end blanks to opposite ends of one of the side walls and stitching them to such side walls by simultaneously driven stitches, then matching the succeeding set of corresponding shallow flaps to the bottom wall and uniting the same thereto by simultaneously driven stitches, and thirdly, uniting the succeeding set of corresponding flaps to the second side wall by simultaneously driven stitches.

5. The method of constructing a fiber shipping case, which consists in cutting and scoring a blank to provide at opposite ends the two cover flaps with an intervening bottom wall and side walls, the cutting and scoring of two separate end blanks to form the end body and shallow flaps on the four sides of the end wall, the stitching of the corresponding end flaps of the two end blanks to opposite ends of one side wall of the body blank, then the folding of the body blank and the end blanks and the lapping of the succeeding set of shallow flaps of the end blanks over the bottom wall of the body blank and stitching such flaps thereto, then the folding of the body blank and the end wall blanks to bring the third set of end wall flaps over the second side wall of the body blank and stitching the same thereto to complete the case.

6. The sub-method in constructing a fiber shipping case from body blanks scored to provide side and bottom walls and cover flaps, and end blanks provided with shallow flaps on their sides, which consists in folding the corresponding flaps of the two end blanks over the opposite ends of the same wall of the body blank, simultaneously taking two stitches, one through each end wall flap and the body blank at the end of the flaps removed from the operator, then pushing the fastened-together blanks away from the operator and simultaneously stitching the remaining portions of the flaps beginning at the end of the flaps next to the operator and stitching back toward the set of stitches first taken.

7. The sub-method in constructing a fiber shipping case of a body blank scored to form three intermediate walls and cover flaps at opposite ends of the blank and two separate end blanks provided with shallow flaps at the various sides, which comprises the fitting of the end blanks with a set of corresponding flaps overlapping opposite ends of one of the walls of the body, simultaneously taking a set of stitches at the end of the flaps remote from the operator, then pushing the fastened-together blanks in against the resistance of power tending to force the blanks toward the operator and then simultaneously stitching the remaining portions of the flaps beginning at the end of the flaps next to the operator and allowing the power to push the blanks between the stitching operations toward the operator as the stitches are taken backwards toward the first taken set of stitches.

8. The method of assembling a fiber shipping case made of a body blank scored to form two side walls with a bottom wall intervening and end blanks some of said blanks being provided with three sets of securing flaps which consists in holding the end blanks at the end of one side wall of the body blank with one of said securing flaps at each end overlying the adjacent blank, or blanks and simultaneously stitching such flaps to such blank or blanks, then secondly folding the body blank to bring the bottom wall perpendicularly to the succeeding edges of the end blanks and folding the next pair of flaps over the adjacent perpendicularly placed blank or blanks and simultaneously stitching said two flaps to such adjacent blank or blanks, and third folding the body blank to bring the other side wall perpendicularly to the end blanks at third set of edges and the folding of the third set of securing flaps over the adjacent blank or blanks and simultaneously stitching the said pair of flaps to such blank or blanks.

9. The method of constructing a shipping case which comprises the cutting and scoring of a blank to form at the opposite ends the cover flaps and intervening thereof three walls constituting the two side walls and the bottom of the case, then cutting and scoring of two separate blanks to form end walls, the said blanks being also cut and scored so that they are provided with three pairs of securing flaps, the securing of the end blanks to a side wall of the body blank by simultaneously stitching the adjacent pair of securing flaps to the adjacent blank structure, then the folding of the body blank to bring the bottom wall perpendicular with the end blanks and the simultaneous securing of the two end blanks to the ends of the bottom wall by folding over the succeeding pair of securing flaps and simultaneously stitching them to the adjacent blank structure, and finally the folding of the body blank to bring the other side wall perpendicular with the end blanks and securing the end blanks thereto by simultaneously stitching the remaining pair of securing flaps to the adjacent blank structure to complete the assembly.

10. The sub-method in constructing a fiber shipping case from a body blank scored to provide side and bottom walls and end blanks, said blanks being provided with securing flaps for securing the end blanks and body blank together, which sub-method consists in folding over the securing flaps on the adjacent blank, simultaneously taking two stitches one through each flap and the underlying blank at the end of the flap removed from the operator, then pushing the fastened together blanks away from the operator and simultaneously stitching the remaining portions of the flaps beginning at the end of the flaps next to the operator and stitching back toward the set of stitches first taken.

In testimony whereof I affix my signature.

HERBERT R. BLISS.